March 3, 1942. E. L. STRAUB 2,275,205
ROTARY ENGINE
Filed July 18, 1938 5 Sheets-Sheet 1

INVENTOR.
Edward L. Straub
BY
ATTORNEY.

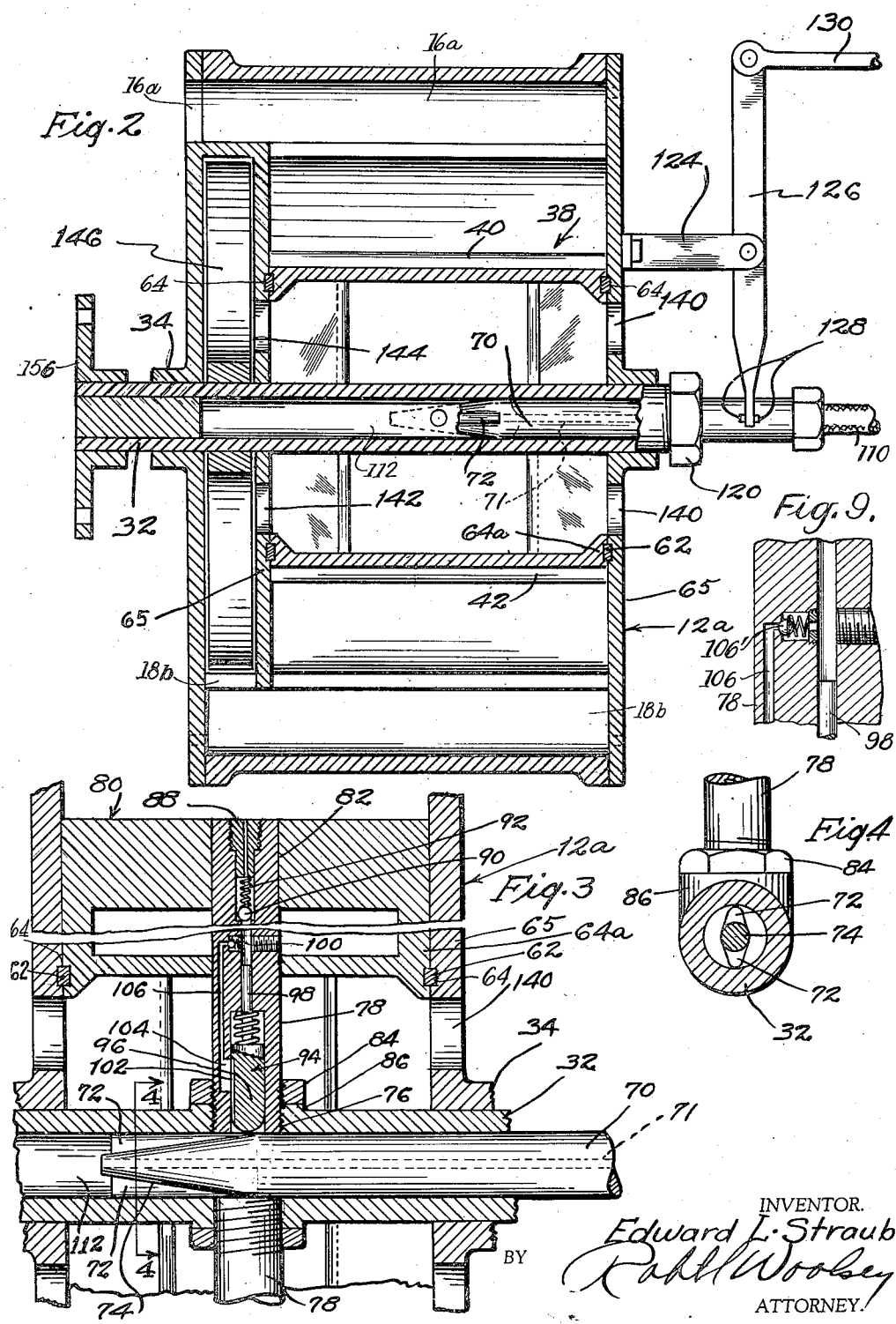

March 3, 1942. E. L. STRAUB 2,275,205
ROTARY ENGINE
Filed July 18, 1938 5 Sheets-Sheet 3
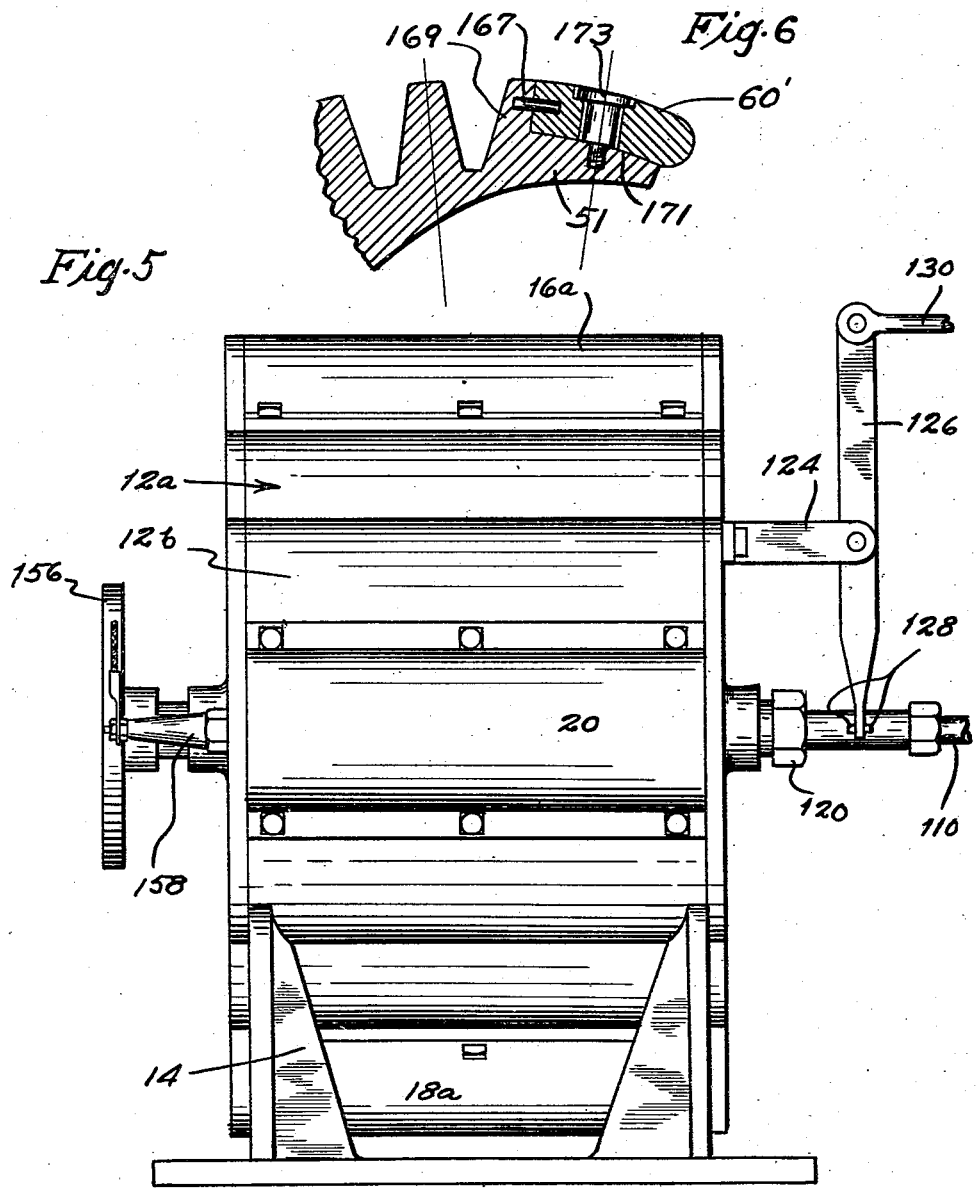
INVENTOR.
Edward L. Straub
BY
ATTORNEY.

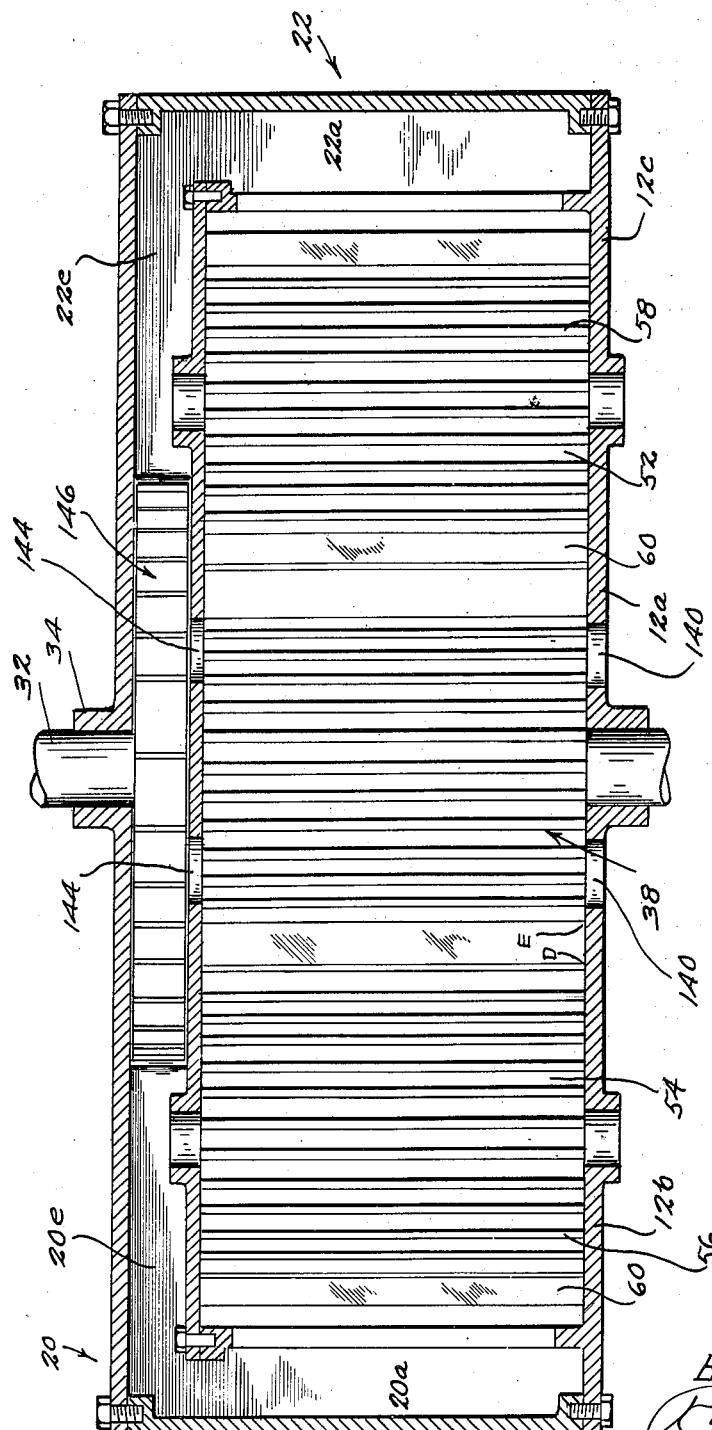

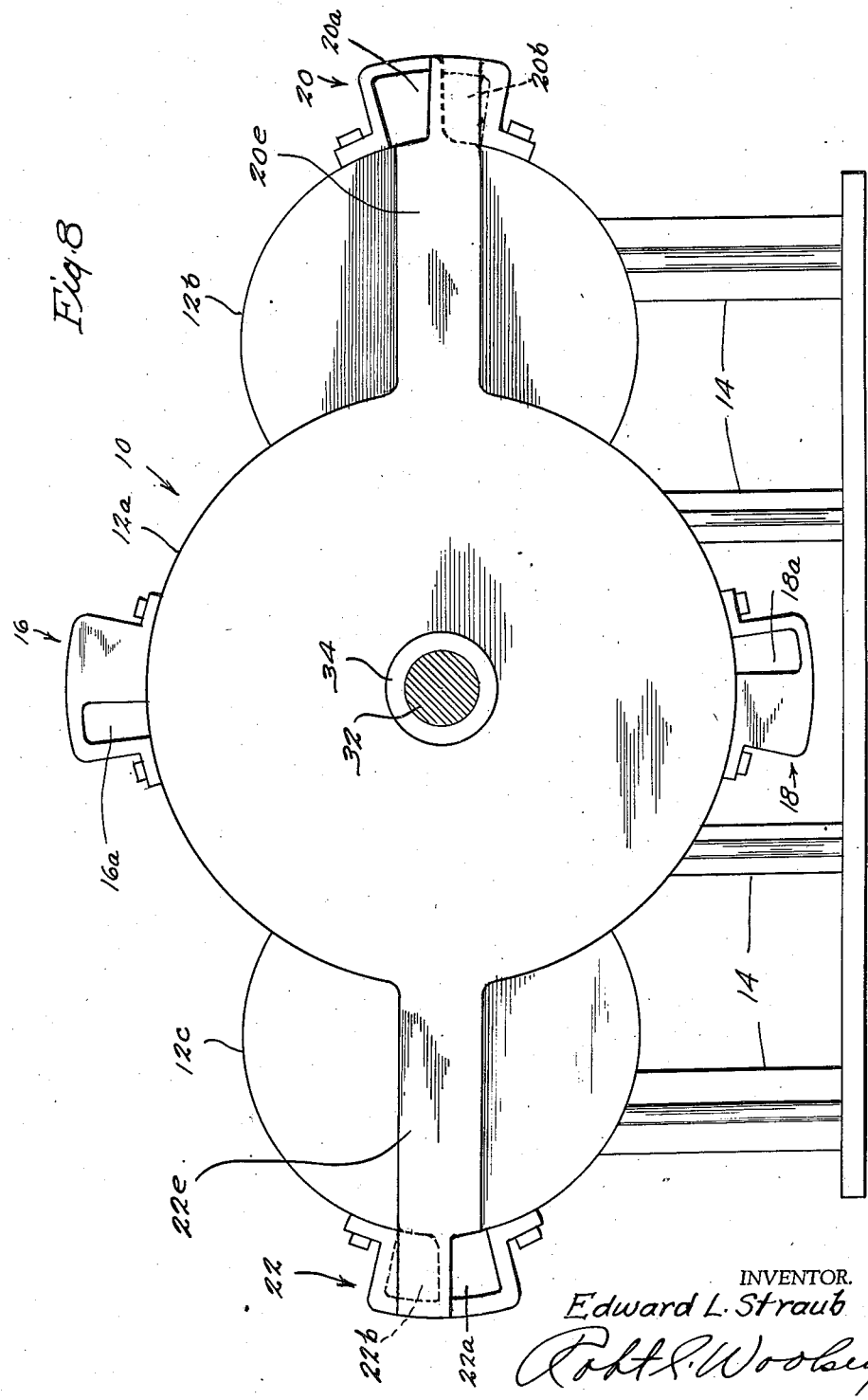

Patented Mar. 3, 1942

2,275,205

UNITED STATES PATENT OFFICE 2,275,205

ROTARY ENGINE

Edward L. Straub, Anaheim, Calif.

Application July 18, 1938, Serial No. 219,763

3 Claims. (Cl. 123—13)

The present invention refers to internal combustion engines of the so-called rotary type, and has for its principal object the development of a simple, reliable and low cost prime mover.

Another object of the invention resides in the provision of rotatable lobes as effective areas for application of pressure gases, and which lobes are adapted to nest within recesses formed within rotatable combustion chambers wherein air and fuel are compressed and then ignited for the development of power.

A further object of the invention resides in the novel provision of means to inject fuel into the rotatable combustion chambers, above mentioned, wherein fuel is introduced through the power shaft and then sprayed by injection through the said lobes into the combustion chambers aforementioned.

A still further object of the invention resides in the formation of power lobes as above mentioned, which lobes are adapted to enter the said rotatable combustion chambers in such manner as to effectively seal the said chamber against loss of compression from the beginning of compression until the completion of the power stroke.

An additional feature of the invention resides in the novel means employed to retain all rotatable elements in synchronous relation, the said means including intermittent engagement of said power lobes and said rotatable combustion chambers.

Other objects, features, and advantages of the invention may appear from the accompanying specification, the drawings, and the appended claims.

In the drawings, of which there are three sheets:

Figure 2 is a mid-vertical sectional elevation taken substantially along line 2—2, in Figure 1.

Figure 3 is a detail partially in section showing the arrangement used to inject fuel into the combustion chambers.

Figure 4 is a detail taken on line 4—4, in Figure 3, showing the cams which are adapted to variably increase the rate of fuel injection.

Figure 5 is an end elevation of the assembled engine of this invention.

Figure 6 is a detail of a fragment of one of the fire chamber units showing one form of securing a compression sealing bar in position, yet permitting relative adjustability thereof.

Figure 7 is a mid-transverse sectional view in plan showing manifolds connecting the compression fan with areas adjacent to and in communication with the combustion chambers for scavenging purposes.

Figure 8 is a side elevation showing the engine of this invention, including exhaust ports and other structural detail.

Figure 9 is a detail showing one form of check valve in a fuel duct of the fuel injector to prevent return flow of fuel under pressure by the fuel piston.

Figure 1:
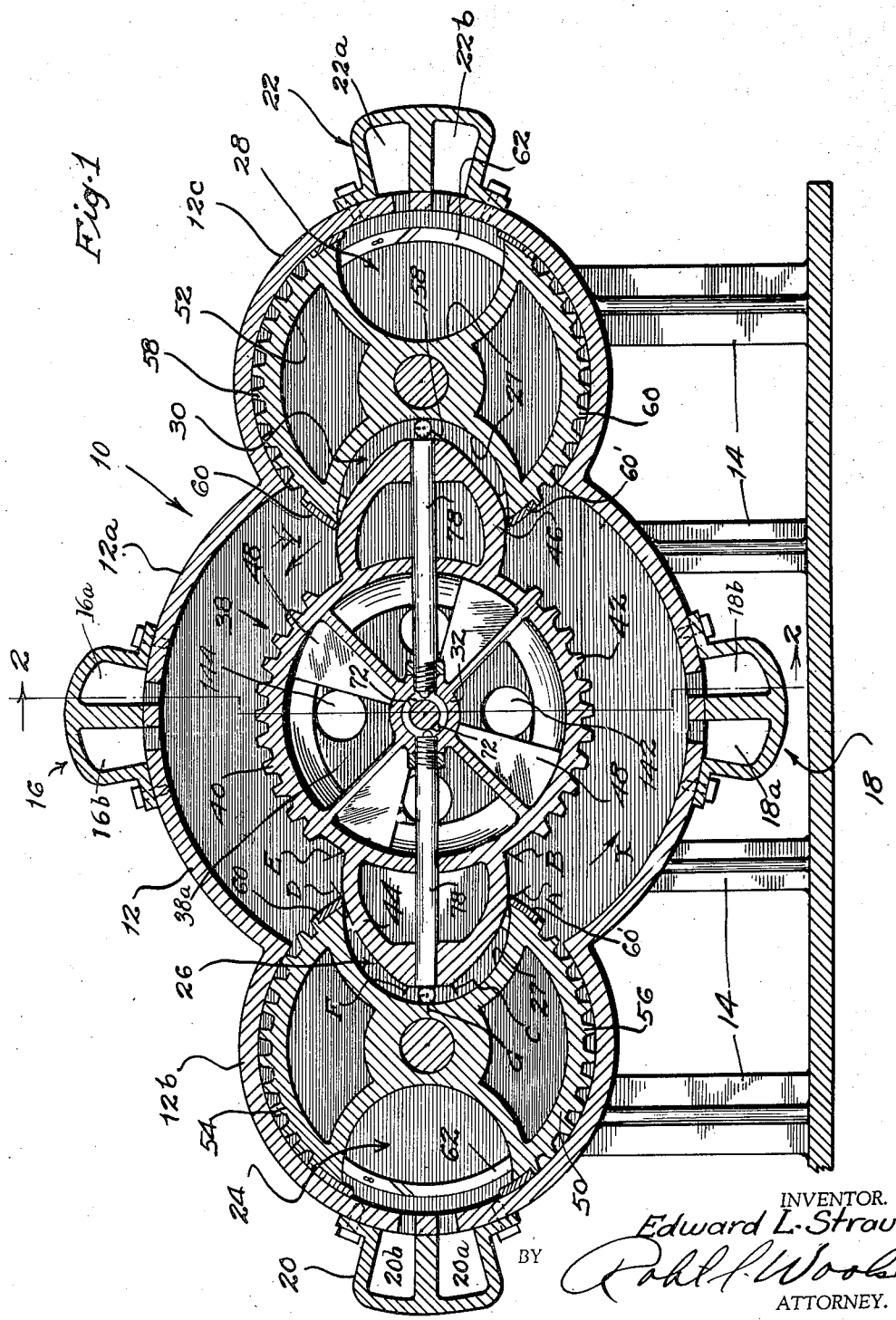
Figure 1 is a transverse sectional elevation showing essential construction of the engine of this invention.

In the drawings the reference character 10 indicates the engine of this invention as a whole, wherein 12 is the casing within which the several elements of the engine function, the casing being supported upon brackets or legs 14 which are only representative of a general means to support the engine in operable position. The present supporting means may or may not be specifically used, depending upon the service in which the engine is employed.

The casing 12 is formed with a central sector 12a which is substantially round upon the interior face thereof, but is in open communication with the laterally positioned sectors 12b and 12c.

The casing 12a is provided with air inlet and exhaust gas manifolds 16 and 18, while manifolds 20 and 22 are adapted to permit exhaust of gases which may be retained in the rotatable fire chambers 24 and 26, and 28 and 30, as well as introduce a measure of fresh air therein, prior to the next subsequent charge of air and fuel for combustion.

A power shaft 32 journalled in bearings 34, is mounted in the transverse center of the casing 12a for rotation.

The shaft 32 as a matter of construction would be formed as a separate unit upon which is fixedly positioned a power impulse unit 38 which is provided with oppositely positioned gear tooth segments 40 and 42, and with lobes 44 and 46 which are oppositely positioned with respect to one another, and intermediately of the ends of the oppositely situated segments 40 and 42. The impulse unit is provided with spokes 48 which are in the nature of radial fan blades and are utilized for the dual purpose of structural strength, and as a means of drawing air inwardly for cooling purposes and for the purpose of charging the combustion chambers 24, 26, 28, and 30 with air under a relatively low pressure prior to fuel injection, as will be hereinafter more definitely set forth.

The sectors 12b and 12c are adapted to receive units 50 and 52 which are provided with the fire chambers aforementioned by inwardly directing certain of the peripheral surfaces thereof.

Toothed segments 54 and 56, and 58 and 60 positioned intermediately of the fire chambers, are adapted to be meshed with the segments 40 and 42 of the impulse unit 38.

Since the lobes 44 and 46 act in co-operation with the several fire chambers 24, 26, 28, and 30 in order to obtain compression prior to fuel injection and firing thereof, it is of the utmost importance that the lobes and fire chambers be so constructed that following disengagement of the toothed segments aforementioned, a lobe, such as lobe 44, begin to enter the recess forming fire chamber 26 and that upon the beginning of such engagement or nesting, point A be in contact with root B of power lobe 44 and that during continued rotation of the lobe, point A move over, upon, and in constant contact with the curved surface of the lobe between the points B and C thereof, and likewise as the lobe 44 moves past its medial horizontal center the point D moves over, upon, and in constant contact with the curved surface of the lobe 44 between the points E and F thereof.

The curve of the recesses or fire chambers may be described as follows since their configuration has been developed by experiment rather than mathematical formula.

The surfaces of the lobes beginning at their root base as indicated by letters B and E and extending to their point of intersection at G, if such point of intersection were developed instead of foreshortened in the drawings, form curves of constantly varying degree.

The pitch diameter of the impulse unit is equal to the pitch diameter of either of the units 50 or 52, and may be of any diameter to suit the required power output.

If the impulse unit is rotatably mounted upon a fixed axis and one of the units 50 or 52 is mounted upon such an axis as to be in normal mesh therewith, and are then rotated in constant rates of speed, the inner line of the curvature D, G, A, of the fire chambers 24, 26, 28, and 30 may be described as that line drawn by the point G which is one pitch radius plus any part of another radius revolving simultaneously with the impulse unit across the face of the unit 50 or 52 being delineated.

Points D and A are thus located at the intersection of the curve drawn by point G and the pitch circle of units 50 or 52.

Going through the same portion of rotation as delineated in the drawings by the surface D—G—A, points D and A will draw along the line B, A, G, and F, D, G respectively. The outermost portion of the surface E, G, B, is then machined to coincide with the inner surface of sector 12a, thus forming a sealing surface along the inner wall of sector 12a, and also permits air in the compression chamber to pass from in front of the lobe, to mix with injected fuel and be ignited behind the lobe, thereby insuring a proper fuel and air mixture.

It has been found that if the inner faces 27 of the fire chambers are thus defined, the points A and D on the pitch line of fire chamber 26, and like points on the several other fire chambers, are in constant contact with the curved surfaces of the lobes 44 and 46, thereby effectively sealing against loss of compression during the compression interval, and likewise sealing against undue loss of pressure gas following ignition of the fuel charge.

It may be here stated that an insert of suitable steel in the form of a transversely extending bar 60' may be used to form the actual points of engagement A and D with the lobes of the impulse unit, serving in the manner of the standard piston ring to compensate for wear, etc.

As shown in Figure 6, the bar 60' may be secured in position by means of a pin 167 seated in the half-tooth 169 against which the bar abuts, being free within certain limits to move in the direction of rotation upon such pin, while being held in practical contact with the pitch line seat 171 therefor, by means of screw 173. Clearance is provided in the bar 60' for adjustment, while the screw is threadedly engaged in the structure 51, which is typical of all of the units 50 and 52.

Sealing rings 62 fitted within an annular groove 64 in the walls 65 of sectors 12a, and 12b, and 12c and likewise fitting into complementary grooves 64a in the side-walls of each of the units 50 and 52, and of the impulse unit 38, provide a seal against undue loss of pressure with respect to these surfaces.

Reference will now be made to the structure devised to fuel the engine of this invention.

The power shaft 32 may be, as previously stated, either formed as a separate unit with respect to the impulse unit per se, or it may be formed integrally therewith and then machined to precision. However in either case, the power shaft is tubular in part to receive a non-rotatable tapered shaft 70 which is formed with cams 72 along the tapered face 74 thereof. The shaft 32 is provided with an opening 76 which is threaded to adjustably receive a tube 78 through which fuel may pass. The flattened end 80 of each of the lobes is provided with an aperture 82 to permit insertion of the tube 78, while a lock-nut 84 in threaded engagement with the tube 78 and seated upon a boss 86 is adapted to provide a degree of adjustment therein as may be required.

The tube 78 is counter-bored at its outer end to receive an adjustable and replaceable tip 88, while a ball check valve 90 held in position by means of a spring 92 is adapted to prevent back-fire back-pressure into the tube 78. A piston 94 having an enlarged end 96 which is adapted to ride over the cams 72 for the purpose of reciprocation, is provided with a stem 98 which fits within a matched opening 100 within the tube 78, and which opening terminates adjacent the inner face of the ball check valve 90. The piston 94 is provided with a small groove 102 which extends from the free end thereof and along its face, terminating at such a point as to always be in open communication with a port 104 which is in open communication with a cored passageway 106 which in turn terminates in the opening 100 whereby fuel may be conducted to a point between the ball check valve 90 and the free end of the stem 98. A check valve 106' prevents the return of fuel from the opening 100. Fuel is conducted through the flexible tube 110, thence through the passageway 71 in shaft 70 to the free end (tapered) thereof, from which it flows to fill the cavity 112, flowing upwardly to enter groove 102.

The tapered shaft 70 is movable inwardly or outwardly through a gland 120 secured upon the free end of the power shaft 32, thus tending to prevent loss of fuel which is of course fed in under a degree of pressure from a suitable container, not shown.

The rate of fuel consumption is variable of course with power requirements, and such variation is obtainable by sliding the shaft 70 inwardly or outwardly whereby the end 96 of piston 94 will be given a greater or lesser throw. The greater the length of the stroke of stem 98, the greater will be the volume of fuel ejected from the opening 100.

Movement of the shaft 70 may be accomplished by means of suitable leverage, one form of which is shown in Figure 2, wherein a bracket 124 secured to the exterior wall 65 is adapted to pivotally support a finger 126, one end of which is positioned between bosses 128 on the shaft 70, while the other end thereof is suitably connected through rod 130 with a control lever, not shown.

The wall 65 is provided with suitable openings 140 through which air may flow by induction to enter the interior 38a of impulse unit 38, and from which it is forced by reason of the action of the fan blades (spokes) 48, which form part of the structure of the impulse unit, through openings 142 to enter the compression fan chamber 144, from which it is evacuated by the action of compression fan 146, flowing outwardly to enter the inlet divisions 16b, 18b of the manifolds 16 and 18.

Operation of the engine of this invention may be described as follows:

A standard crank or other means operable through the coupling 156 may be used to initially turn the engine over, thereby compressing a volume of air in the compression or fire chamber 26, and in timed relation thereto, causing a charge of fuel to be injected into the compression chamber, following which the mixture of air and fuel is ignited by means of spark plugs 158. The resulting explosion forces power lobe 44 of the impulse unit 38 in a downward direction as indicated by arrow "X". Simultaneously therewith, or in other pre-arranged order, lobe 46 compresses a charge of air and fuel, which is ignited in the manner just described, and which is quite ordinary insofar as the mere act of compressing air and fuel, and then igniting the same is concerned.

Explosion of the fuel charge in chamber 30, forces lobe 46 in an upward direction as indicated by arrow "Y."

Explosion of a fuel charge in chamber 30 forces lobe 46 in an upward direction as indicated by the arrow Y, while in chamber 26, gases resulting from the last previous explosion therein, escape through exhaust outlet 18a in manifold 18, and gases from the burning fuel charge in chamber 30 escape through the exhaust outlet 16a in manifold 16, while residual gases in the combustion chambers 24, 26, 28, and 30 are enabled to exhaust through divisions 20a and 22a of manifolds 20 and 22, and as a subsequent phase of rotation of the chambers, a measure of fresh air is enabled to flow through the divisions 20b and 22b of the manifolds 20 and 22 prior to the next subsequent fuel charge because of inflowing air from ducts 20e and 22e.

The engine of this invention is noteworthy in numerous particulars, among which may be pointed out the following:

(1) A minimum of moving parts, hence increased operating efficiency.

(2) Low cost due to extreme simplicity of construction, and minimum number of accessories.

(3) Minimum parts replacement due to simplicity of construction and minimum of accessories.

(4) A radical departure from conventional types of engine construction in general.

(5) The application of a new principle in compressing a combustible fuel charge.

(6) The development of a new type of engine, wherein all parts are rotative, except the fuel injection system, and wherein lobes upon the impulse unit are adapted to enter recesses in revolvable units which form the counterpart of the cylinder-head in the conventional type of engine.

It is obvious that various changes in detail of minor importance may be made in the structure shown in the drawings and described in the specification, and the scope of the invention is not to be construed as limited thereby, but rather the measure of the invention is to be determined by the scope of the appended claims, the drawing and specification being merely illustrative of the principle founded herein, and upon which the invention rests.

I claim:

1. An internal combustion engine comprising in combination and including a housing structure therefor, an impulse unit, lobes on said impulse unit, combustion chamber units adapted to synchronously rotate with said impulse unit, said units being formed with recesses adapted to receive said lobes in such manner that an edge of one of said recesses is in constant contact with one of the faces of one of said lobes from the beginning to the end of a cycle of engagement thereof, means to introduce fuel into a combustion chamber at the time of approximate maximum engagement of one of said lobes and recesses, means to ignite fuel, and means to scavenge the products of combustion thereof.

2. In a rotary engine having a rotatable impulse unit provided with lobes adapted to nest within rotatable combustion chambers associated therewith and having air intake and exhaust ports, the combination of dual means to introduce air under pressure into said combustion chambers, said dual means comprising radial fan-like blades extending from a central power shaft in the impulse unit to inner peripherial surfaces of the impulse unit whereby upon rotation air is drawn into the unit and is subsequently expelled through said exhaust ports, a compression fan, manifolds extending from adjacent said compression fan to said combustion chambers, said compression fan being driven by said power shaft and being adapted to receive air discharged from said air-exhaust ports to force the same through said manifolds to said combustion chambers.

3. In a rotary engine having a sealed casing adapted to house an impulse unit provided with lobes adapted to nest within rotatable combustion chambers associated therewith, the combination of means to charge said combustion chambers with air for combustion of fuel ignitable therein, said means comprising a rotatable impeller located within and rotatable with said impulse unit, a second impeller, said second impeller being operable in unison with said impulse unit and being adapted to receive air from said first mentioned impeller and to deliver the same to a manifold from which said air will enter said combustion chambers, and other manifolds, said last mentioned manifolds being adapted to permit exhaust of burned gases.

EDWARD L. STRAUB.